United States Patent
Kalach et al.

(10) Patent No.: US 11,546,146 B2
(45) Date of Patent: Jan. 3, 2023

(54) METHODS, ENCODER AND DECODER USING ENCRYPTION AND AUTHENTICATION FUNCTIONS FOR ENCRYPTING AND DECRYPTING A MESSAGE

(71) Applicant: HUAWEI TECHNOLOGIES CO., LTD., Guangdong (CN)

(72) Inventors: Kassem Hassan Kalach, Waterloo (CA); Ali Abbassi, Kitchener (CA); Teng Wu, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 17/063,232

(22) Filed: Oct. 5, 2020

(65) Prior Publication Data
US 2022/0109559 A1 Apr. 7, 2022

(51) Int. Cl.
 *H04L 9/08* (2006.01)
 *H04L 9/32* (2006.01)
 *H04L 9/06* (2006.01)

(52) U.S. Cl.
 CPC .......... *H04L 9/085* (2013.01); *H04L 9/0631* (2013.01); *H04L 9/0637* (2013.01); *H04L 9/0861* (2013.01); *H04L 9/3242* (2013.01)

(58) Field of Classification Search
None
See application file for complete search history.

(56) References Cited

U.S. PATENT DOCUMENTS

| 6,226,742 B1 * | 5/2001 | Jakubowski | H04L 9/0637 380/37 |
| 8,984,268 B2 * | 3/2015 | VanHeyningen | H04L 63/166 380/37 |

(Continued)

FOREIGN PATENT DOCUMENTS

| CN | 110401527 A | 11/2019 |
| CN | 111465008 A | 7/2020 |
| WO | 2007059558 A1 | 5/2007 |

OTHER PUBLICATIONS

International Search Report and Written Opinion issued in co-pending International application No. PCT/CN2021/087951 dated Jul. 8, 2021.

(Continued)

*Primary Examiner* — Bassam A Noaman
(74) *Attorney, Agent, or Firm* — BCF LLP

(57) ABSTRACT

An encoder encrypts a message by generating a nonce, using a first encryption key to encode the nonce, splitting the message into a first part and a second part, using the first encryption key and the encoded nonce to encrypt the first part of the message into a first ciphered part, using a second encryption key, the encoded nonce and the first ciphered part to generate an initialization vector, using the first encryption key and the initialization vector to encrypt the second part of the message into a second ciphered part, and generating a ciphertext comprising the first ciphered part, the second ciphered part, the initialization vector and the nonce. A decoder uses a reverse process to decrypt the message. The decryption comprises generating a copy of the initialization vector, which is compared to the initialization vector in order to verify that the message is properly decrypted.

18 Claims, 9 Drawing Sheets

(56) References Cited

U.S. PATENT DOCUMENTS

| | | | |
|---|---|---|---|
| 2002/0071552 A1 | 6/2002 | Rogaway | |
| 2008/0260147 A1* | 10/2008 | Shin | H04L 9/0643 380/46 |
| 2010/0169645 A1* | 7/2010 | McGrew | H04L 9/0637 380/268 |
| 2011/0153862 A1* | 6/2011 | Roosta | H04L 45/00 709/234 |
| 2013/0145169 A1* | 6/2013 | Poovendran | H04L 9/0643 713/181 |
| 2014/0195807 A1* | 7/2014 | Bar-El | H04L 9/083 713/168 |
| 2016/0309343 A1* | 10/2016 | Lin | H04W 24/02 |
| 2017/0111330 A1* | 4/2017 | Mosko | H04L 9/302 |
| 2017/0134158 A1* | 5/2017 | Pasol | H04L 9/3066 |
| 2017/0244566 A1* | 8/2017 | Tschache | H04L 9/3242 |
| 2017/0366340 A1* | 12/2017 | Wyseur | H04L 9/3242 |

OTHER PUBLICATIONS

Rogaway et al., "A Provable-Security Treatment of the Key-Wrap Problem", pp. 373-390, 2006.

Namprempre et al., "Reconsidering Generic Composition", EUROCRYPT 2014, LNCS 8441, pp. 257-274, 2014.

Gueron et al., "AES-GCM-SIV: Specifications and Analysis", Dec. 14, 2018.

Bernstein, "The Poly1305-AES message-authentication code", 2005.

Procter, "A Security Analysis of the Composition of ChaCha20 and Poly1305", 2014.

Shoup, "On Fast and Provable Secure Message Authentication Based on Universal Hashing", Adavnces in Cryptology—CRYPTO '96, LNCS 1109, pp. 313-328, 1996.

Bernstein, "Stronger security bounds for Wegma-Carter-Shoup authenticators", Feb. 27, 2005.

Harkins, "Synthetic Initialization Vector (SIV) Authenticated Encryption Using the Advanced Encryption Standard (AES)", RFC 5297, Oct. 2008.

Gueron et al., "AES-GCM-SIV: Nonce Misuse-Resistant Authenticated Encryption", RFC 8452, Apr. 2019.

Nir et al., "ChaCha20 and Poly1305 for IETF Protocols", RFC 7539, May 2015.

Dworkin, "Recommendation for block cipher modes of operation: Galois/Counter Mode (GCM) and GMAC", NIST Special Publication 800-38D, Nov. 2007.

Dworkin, "Recommendation for block cipher modes of operation, methods and techniques", NIST Special Publication 800-38A, 2001.

Pereira et al., "Fast robust template matching for affine resistant image watermarks", International Workshop on Information Hiding, Springer, Berlin, Heidelberg, 1999.

Poljicak et al., "Discrete Fourier transform-based watermarking method with an optimal implementation radius", Journal of Electronic Imaging, 20(3), 2011, 033008.

* cited by examiner

METHODS, ENCODER AND DECODER USING ENCRYPTION AND AUTHENTICATION FUNCTIONS FOR ENCRYPTING AND DECRYPTING A MESSAGE

CROSS-REFERENCE TO RELATED APPLICATIONS

This is the first application filed for the instantly disclosed technology.

TECHNICAL FIELD

The present disclosure generally relates to the field of information technology and, in particular, to methods, an encoder and a decoder using encryption and authentication functions for encrypting and decrypting a message.

BACKGROUND

One of the important challenges in the field of information technology (IT) relates to the need to provide confidentiality and integrity in the transmission of messages. For example, Authenticated Encryption (AE) schemes are intended to fulfill these goals, particularly for messages consisting of plaintext. To this end, AE schemes combine an encryption scheme with a Message Authentication Code (MAC). AE with Associated Data (AEAD) is intended to be a general and secure construction of AE. AEAD intends to provide confidentiality and integrity of plaintexts, as well as integrity of non-secret information referred to as associated/additional data. Advanced Encryption Standard-Galois Counter Mode (AES-GCM) is the most popular standard AEAD today.

AEAD provides a high security level for symmetric encryption as long as the underlying schemes satisfies some requirements.

Synthetic Initialization Vector (SIV) mode is recently proposed AEAD scheme, denoted AES-GCM-SIV, that is resistant to IV misuse. FIG. 1 (Prior Art) is a schematic diagram of an authenticated encryption with associated data (AEAD) technique using a synthetic initialization vector (IV) for encoding a message. A message M may contain information in any one or a broad range of types and formats, containing, without limitation text, sound, image, code, and the like, in sizes ranging from kilobytes to gigabytes. Associated data A may be provided and be related to the message M. The associated data A may for example include a timestamp, a context and/or accounting information related to the message M. A nonce N is generated, being for example randomly generated. The nonce N, the message M and the associated data A are fed to a message authenticated code function (MAC) using a secret key L, this MAC function being denoted as $F_L$. The MAC function $F_L$ produces an initialization vector IV. The message M and the initialization vector IV are fed to a generic encryption function using a secret key K, denoted $\varepsilon_K$.

The secret key K may for example be a symmetric key. The encryption function $\varepsilon_K$ outputs a ciphertext C, which is an encrypted version of the message M. The initialization vector IV produced by the MAC function $F_L$ is also output, for example in the form of a tag.

The nonce N, the ciphertext C and the initialization vector IV may be provided to a decoder having cognizance of the secret key K and of the secret key L. The decoder applies the received ciphertext C to its own copy of the encryption function $\varepsilon_K$ to regenerate a copy M' of the message M and a copy IV' of the received initialization vector IV. The decoder compares the copy IV' to the initialization vector IV. If the copy IV' is identical to the received initialization vector IV, the message M has been properly decoded; otherwise the message is deemed to be improperly received and is ignored. The copy M' of the message, the initialization vector IV (or its copy IV') and the nonce N are applied to a copy of the MAC function $F_L$ to generate a copy A' of the associated data A.

However, it has been observed that many things go wrong with solutions as illustrated in FIG. 1. For example, if the AES-GCM scheme is used with repetition of the same IV under the same encryption key, confidentiality of messages may be completely lost. Unfortunately, IT practitioners have misguidedly believed that encrypted data may prevent cipher-text malleability and/or tampering.

The SIV solution is frequently impractical because of its performance issues, particularly in contexts where hardware acceleration is not possible, as in the case of streaming on devices having performance constraints, for example a lack of sufficient processing capacity.

Consequently, there is a need for improvements in the areas of message confidentiality and integrity protection.

SUMMARY

An object of the present disclosure is to provide methods, an encoder and a decoder for encrypting and decrypting a message, the methods, encoder and decoder overcoming the inconveniences of earlier technologies.

An aspect of the present disclosure is to provide a method for encrypting a message, comprising:
generating a nonce;
using a first encryption key to encode the nonce;
splitting the message into a first part and a second part;
using the first encryption key and the encoded nonce to encrypt the first part of the message into a first ciphered part;
using a second encryption key, the encoded nonce and the first ciphered part to generate an initialization vector;
using the first encryption key and the initialization vector to encrypt the second part of the message into a second ciphered part; and
generating a ciphertext comprising the first ciphered part, the second ciphered part, the initialization vector and the nonce.

In some implementations of the present technology, the initialization vector is generated using the second encryption key, the encoded nonce, the first ciphered part and associated data related to the message; and the generated ciphertext further comprises the associated data related to the message.

In some implementations of the present technology, the method further comprises computing an exclusive-OR function of the first ciphered part and of the second part of the message; the initialization vector being generated using the second encryption key, the encoded nonce and a concatenation of a result of the exclusive-OR function with first and last blocks of the first ciphered part.

In some implementations of the present technology, the method further comprises computing an exclusive-OR function of the first ciphered part and of the second part of the message; the initialization vector being generated using the second encryption key, the encoded nonce, a concatenation of a result of the exclusive-OR function with first and last blocks of the first ciphered part and associated data related to the message, the generated ciphertext further comprising the associated data related to the message.

In some implementations of the present technology, generating the nonce comprises generating a unique nonce.

In some implementations of the present technology, the method further comprises applying a symmetric key to a key derivative function to generate the first and second encryption keys.

In some implementations of the present technology, the nonce is encrypted using an advanced encryption standard (AES) function.

In some implementations of the present technology, the method further comprises padding one of the first and second message parts so that the first and second message parts have equal sizes.

In some implementations of the present technology, the first and second parts of the message are encrypted using advanced encryption standard block cipher mode (AES-CBC) functions.

In some implementations of the present technology, the initialization vector is generated using a Galois message authentication code (GMAC) function.

Another aspect of the present disclosure is to provide an encoder, comprising:
  an input/output device adapted to receive a message and to transmit a ciphertext; and
  a processor operatively connected to the input/output device and to a memory device comprising a non-transitory computer-readable medium having stored thereon machine executable instructions for performing, when executed by the processor, the method for encrypting a message.

A further aspect of the present disclosure is to provide a method for decrypting a message, comprising:
  receiving a ciphertext comprising a first ciphered part, a second ciphered part, an initialization vector and a nonce;
  using a first encryption key to encode the nonce;
  using the first encryption key and the encoded nonce to decrypt the first ciphered part into a first received message part;
  using the first encryption key and the initialization vector to decrypt the second ciphered part into a second received message part;
  combining the first received message part and the second received message part to form a decrypted message;
  using a second encryption key, the encoded nonce and the first ciphered part to generate an initialization vector copy; and
  ignoring the received ciphertext if the initialization vector copy is not equal to the initialization vector.

In some implementations of the present technology, the received ciphertext further comprises associated data related to the message; and the initialization vector copy is generated using the second encryption key, the encoded nonce, the first ciphered part and the associated data related to the message.

In some implementations of the present technology, the method further comprises computing an exclusive-OR function of the first ciphered part and of the second received message part; the initialization vector copy being generated using the second encryption key, the encoded nonce and a concatenation of a result of the exclusive-OR function with first and last blocks of the first ciphered part.

In some implementations of the present technology, the method further comprises computing an exclusive-OR function of the first ciphered part and of the second received message part; the received ciphertext further comprising associated data related to the message, the initialization vector copy being generated using the second encryption key, the encoded nonce, a concatenation of a result of the exclusive-OR function with first and last blocks of the first ciphered part and the associated data related to the message.

In some implementations of the present technology, the method further comprises applying a symmetric key to a key derivative function to generate the first and second encryption keys.

In some implementations of the present technology, the nonce is encrypted using an advanced encryption standard (AES) function.

In some implementations of the present technology, the first and second ciphered parts are decrypted using advanced encryption standard block cipher mode (AES-CBC) functions.

In some implementations of the present technology, the initialization vector copy is generated using a Galois message authentication code (GMAC) function.

Yet another aspect of the present disclosure is to provide a decoder, comprising:
  an input/output device adapted to receive a ciphertext and to transmit a decrypted message; and
  a processor operatively connected to the input/output device and to a memory device comprising a non-transitory computer-readable medium having stored thereon machine executable instructions for performing, when executed by the processor, the method for decrypting a message.

Implementations of the present disclosure each have at least one of the above-mentioned objects and/or aspects, but no not necessarily have all of them. It should be understood that some aspects of the present disclosure that have resulting from attempting the above-mentioned object many not satisfy this object and/or may satisfy other objects not specifically recited herein.

Additional and/or alternative features, aspects and advantages of implementations of the present disclosure will become apparent from the following description, the accompanying drawings and the appended claims.

BRIEF DESCRIPTION OF THE FIGURES

The features and advantages of the present disclosure will become apparent from the following detailed description, taken in combination with the appended drawings, in which.

Figure 1:
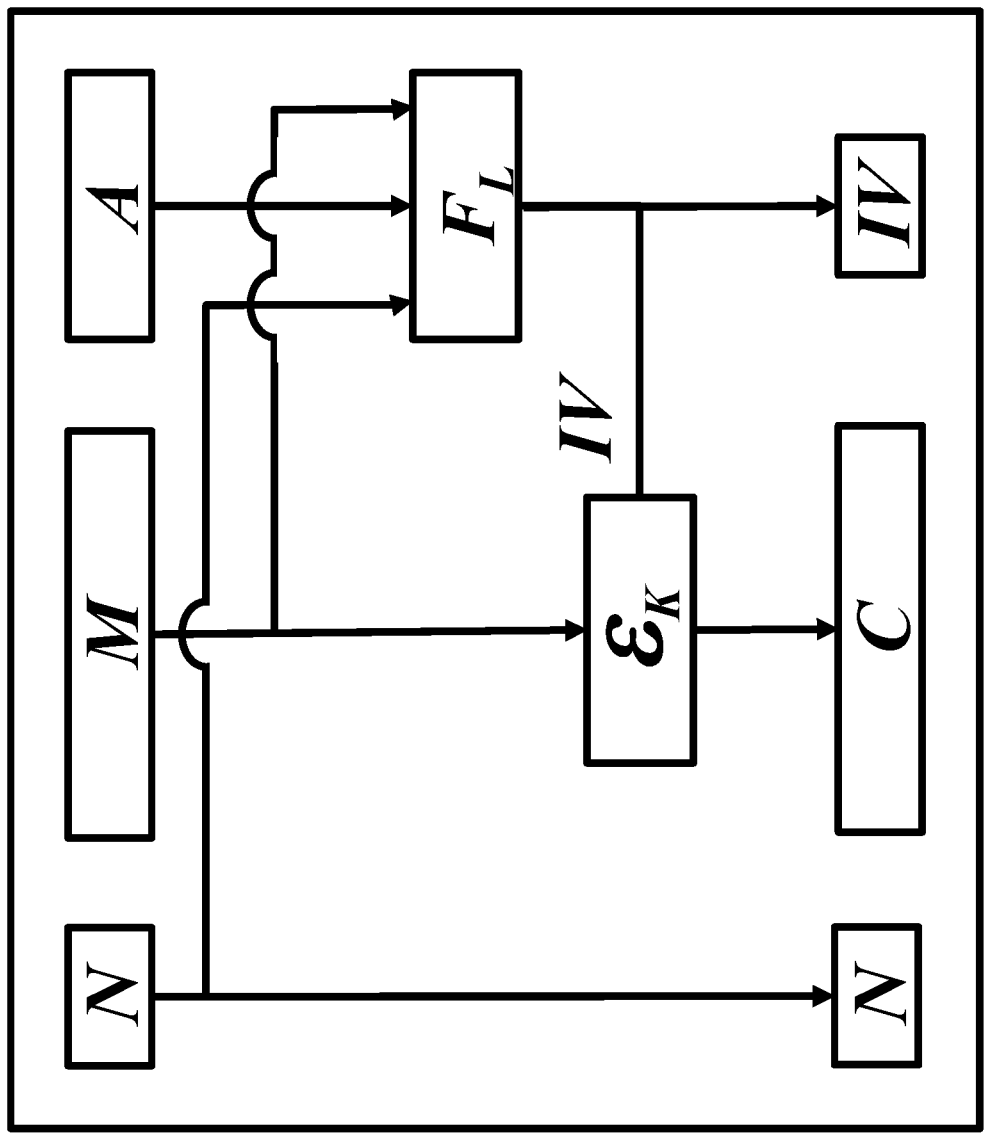
FIG. 1 (Prior Art) is a schematic diagram of an authenticated encryption with associated data (AEAD) technique using a synthetic initialization vector (IV) for encoding a message.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined or indicated by context, all technical and scientific terms used herein have the same meaning as commonly understood by one of ordinary skill in the art to which the described embodiments appertain to.

Generally speaking, the present technology provides a safe message encryption method that reduces amounts of processing used to encrypt and to decrypt messages. A message to be encrypted is split into two parts. A first message part is encrypted into a first ciphered part, using a nonce. The nonce and the first ciphertext are used to generate an initialization vector that is used to encrypt a second message part into a second ciphered part. At least the two ciphered parts, the nonce and the initialization vector are provided to a decoder where reverse operations are executed to decrypt the message.

Figure 2:
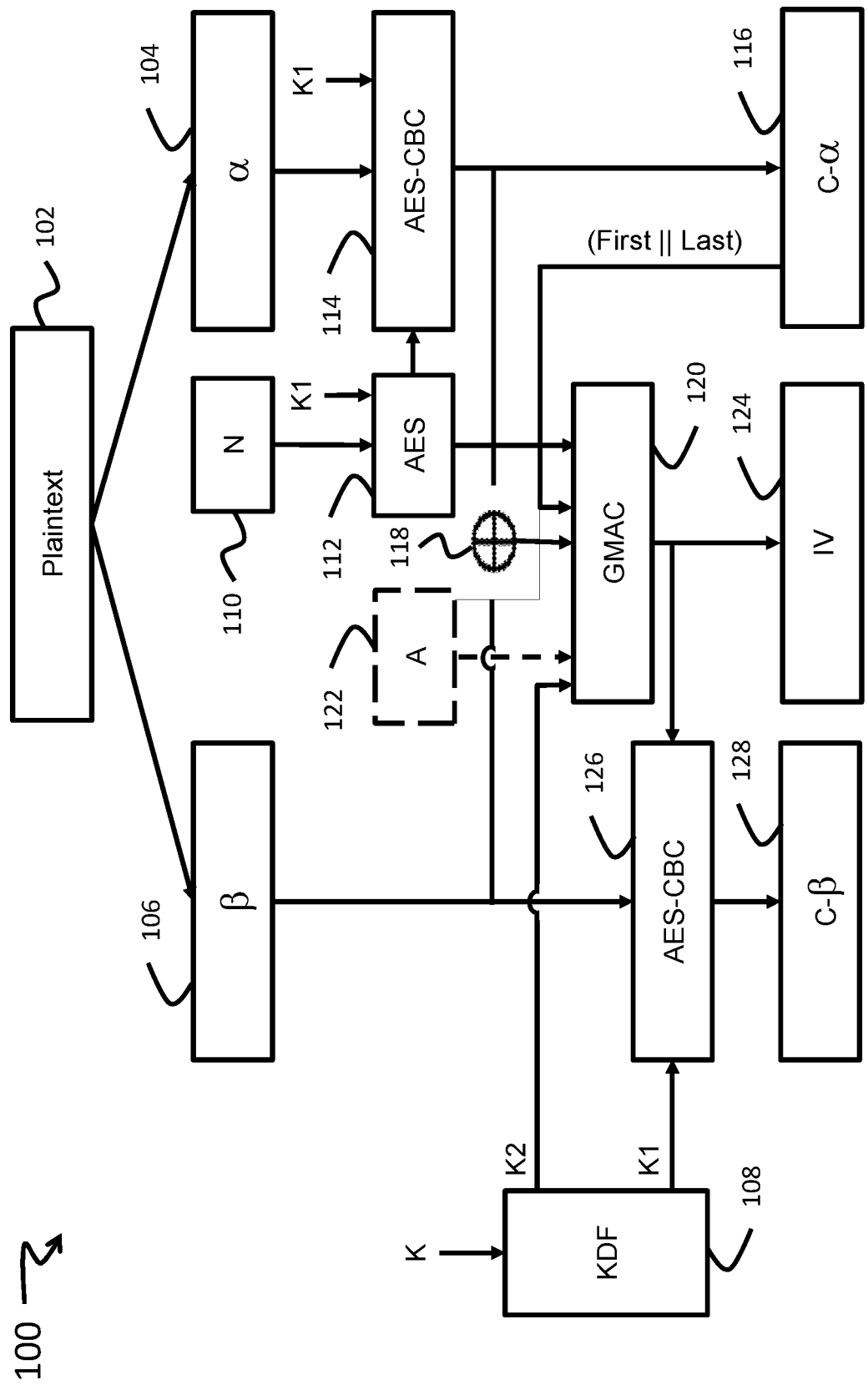
FIG. 2 is a schematic diagram of a technique for encrypting a message in accordance with non-limiting embodiments of the present disclosure.

FIG. 2 is a schematic diagram 100 of a technique for encrypting a message 102 in accordance with non-limiting embodiments of the present disclosure. In an encoder, the message 102, for example and without limitation a plaintext message, is split into two parts 104 ($a$) and 106 (13). The message 102 may simply be split in its middle, for example forming left and right parts. Alternatively, the message 102 may be split in any other known fashion, for example by interleaving its blocks selected in a predetermined manner to form the parts 104 and 106. In an embodiment, the two parts 104 and 106, may be of equal sizes; otherwise, some padding may optionally be added to one of the parts so that the two parts 104 and 106 are of equal sizes. Alternatively, or in addition, both parts 104 and 106 may be padded to fit with the size of the AES-CBC block.

A key K of a generator or owner of the message 102, for example a symmetric key, is applied to a key derivative function (KDF) 108 that generates a pair of complementary encryption keys K1 and K2.

A nonce 110 is generated. In general terms, the nonce 110 may be represented as a number, which may be arbitrary, and that typically has no intrinsic meaning. The nonce 110 may be generated by a process that ensures it unicity so that other nonces generated for other messages will be different. Randomly generating the nonce 110 is also contemplated. The nonce 110 is encrypted using the key K1 in an encryption function 112, for example an advanced encryption standard (AES) function. Part 104 of the message, the encryption key K1 and the encrypted nonce are applied to another encryption function 114, for example an advanced encryption standard block cipher mode (AES-CBC) function, to generate a first ciphered part 116 (C-$\alpha$). Instead of AES-based cipher modes, using other block cipher technologies, for example and without limitation Triple Data Encryption Algorithm (3DES), Blowfish, Camellia, Serpent, PRESENT, CLEFIA, KASUMI, Prince, TWINE, Piccolo, LED, SIMON, SPECK or Midori, is also contemplated.

Part 106 of the message and the first ciphered part 116 are applied to an exclusive-OR function 118. A result of the exclusive-OR function 118 and the encryption key K2 are applied to an authentication function 120, for example a Galois message authentication code (GMAC) function. Instead of GMAC, using other message authentication code technologies, for example and without limitation hash MAC (HMAC), cipher block chaining MAC (CBC-MAC), cypher-based MAC (CMAC) or parallelizable MAC (PMAC), as well as Chaskey, Blake or SipHash algorithms, is also contemplated. The authentication function 120 generates an initialization vector 124. In general terms, the initialization vector 124 may be a mathematical construct, for example a number in vector form, or a multidimensional number representation. First and last blocks of the first ciphered part 116, as well as associated data 122 of the message 102, if present, may also be applied to the authentication function 120 in the generation of the initialization vector 124. In an embodiment, the first and last blocks of the first ciphered part 116 may be used to improve the security of the encryption. Considering a case where an attacker would have modified the ciphertext, these first and last blocks would probably be modified by the attacker. As a result, the decoder would not be able to correctly calculate a copy of the initialization vector 124 and the decoder would ignore the corrupted ciphertext.

Part 106 of the message, the encryption key K1 and the initialization vector 124 are applied to another encryption function 126, which may also be an AES-CBC function, to generate a second ciphered part 128 (C-$\beta$). The first ciphered part 116 the second ciphered part 128, the nonce 110 and the initialization vector 124 are combined into a ciphertext that can then be used by a decoder having cognizance of the key K of the generator or owner of the message 102 to decrypt the message 102. The associated data 122, if present, may also be included in the ciphertext.

Figure 3:
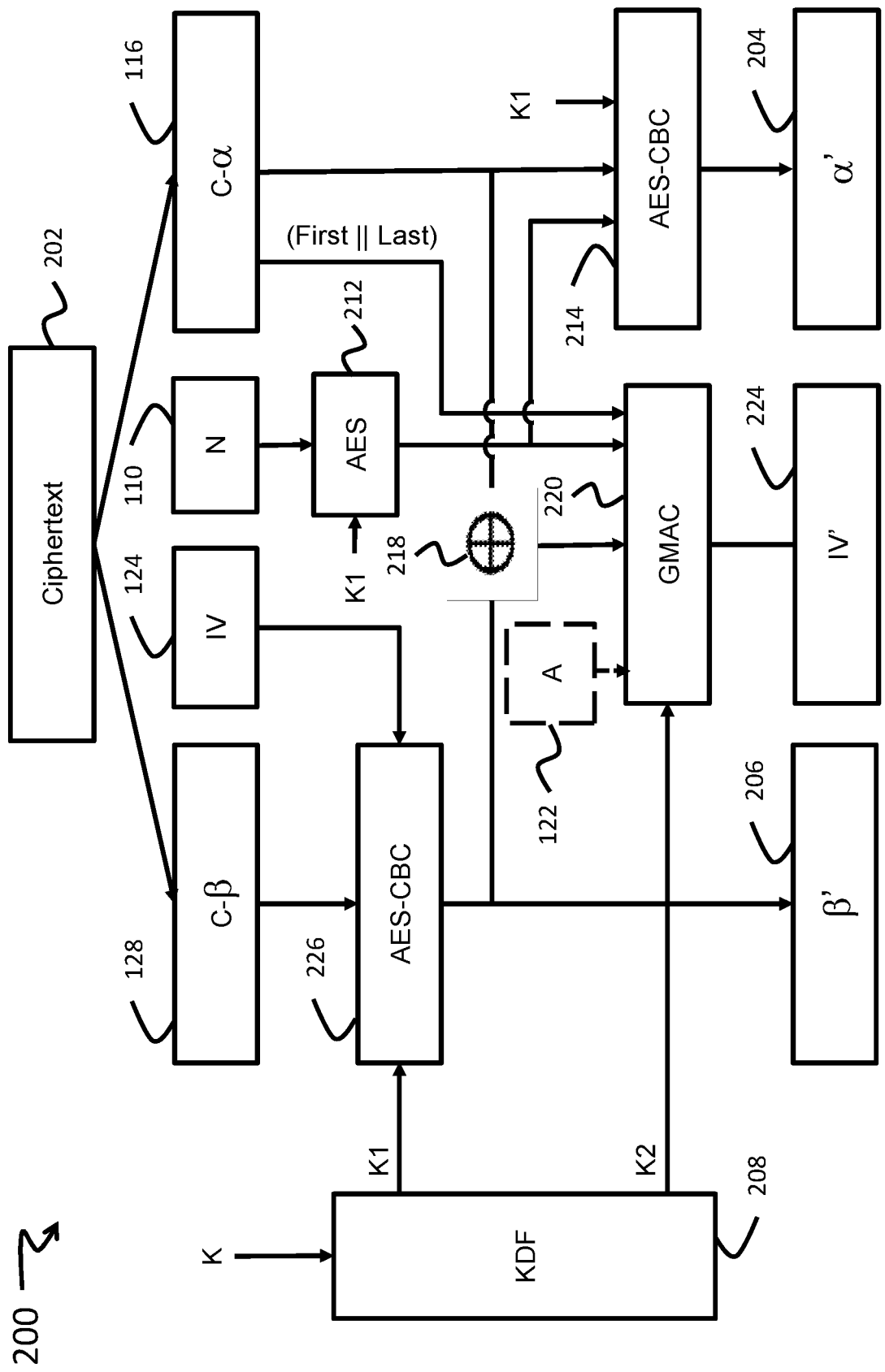
FIG. 3 is a schematic diagram of a technique for decrypting a ciphertext in accordance with non-limiting embodiments of the present disclosure.

FIG. 3 is a schematic diagram 200 of a technique for decrypting a ciphertext 202 in accordance with non-limiting embodiments of the present disclosure. As expressed in the description of FIG. 2, the ciphertext 202 contains the first ciphered part 116 (C-$\alpha$), the second ciphered part 128 (C-$\beta$), the nonce 110 and the initialization vector 124, and may further comprise the associated data 122. A decoder having cognizance of the key K of the generator or owner of the message 102 may decrypt the ciphertext 202 as follows. The key K is applied to a KDF 208 that generates a pair of complementary encryption keys K1 and K2, which match those of the encoder. The nonce 110 is encrypted using the key K1, in an encryption function 212, for example an AES function, which matches the encryption function 112. The first ciphered part 116, the encryption key K1 and the encrypted nonce are applied to another encryption function 214 that matches the encryption function 114, for example an AES-CBC function. The encryption function 214 generates a first received message part 204 ($\alpha'$).

The second ciphered part 128, the initialization vector 124 and the encryption key K1 are applied to another encryption function 226, which matches the encryption function 126 and may also be an AES-CBC function, to generate a second received message part 206 ($\beta'$).

At this time, the decoder should have properly received the encrypted version of the message 102 and should have recovered its decrypted version. The following features allow the decoder to ensure that the result is legitimate.

The second received message part 206 and the first ciphered part 116 are applied to an exclusive-OR function 218. A result of the exclusive-OR function 218 and the encryption key K2 are applied to an authentication function 220, which matches the authentication function 120 and may thus be a GMAC function. The authentication function 220 generates a copy 224 of the initialization vector 124. First and last blocks of the first ciphered part 116, as well as the associated data 122 of the message 102, if present, may also be applied to the authentication function 220 in the generation of the copy 224 of the initialization vector 124.

The decoder may compare the copy 224 with the received initialization vector 124. If there is a match between the two values, the message is properly decrypted into its first and second received message parts 204 and 206, which may be combined in a manner that matches the splitting of the original message 102. The decoder may dismiss the received ciphertext if the copy 224 fails to match the received initialization vector 124.

Although not expressly mentioned in the above description of FIGS. 2 and 3, the ciphertext is provided from the encoder to the decoder along with sufficient information to allow the decoder to identify the source of the message for selecting the proper key K that is applied to the KDF 208, the information also allowing to identify a receiver of the decrypted message.

Figure 4A:
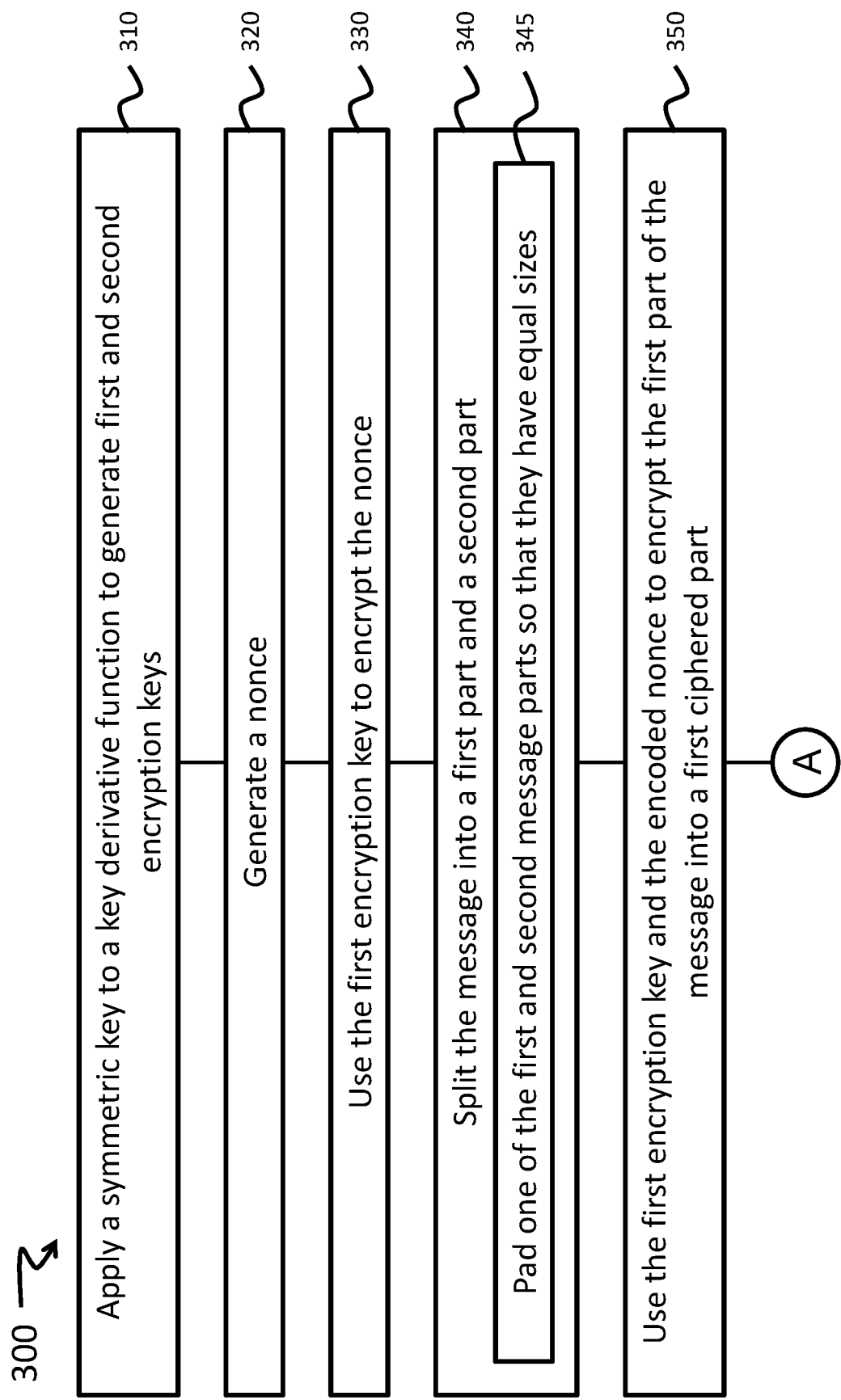
FIGS. 4a and 4b are a sequence diagram of a method for encrypting a message in accordance with non-limiting embodiments of the present disclosure.
Figure 4B:
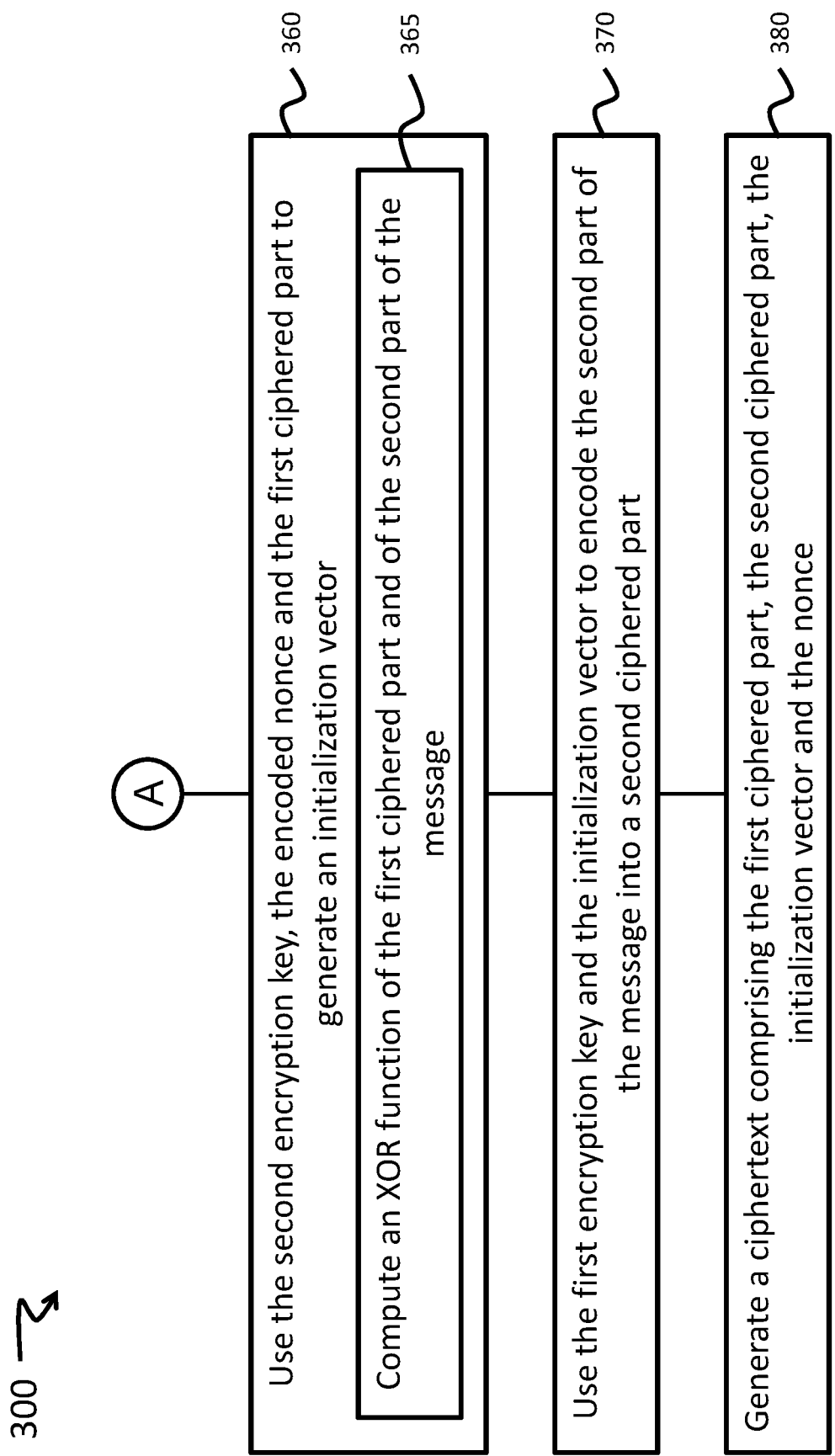

FIGS. 4a and 4b are a sequence diagram of a method for encrypting a message in accordance with non-limiting embodiments of the present disclosure. Some or all of the features of the encoder as expressed in the foregoing description of FIG. 2 may be present in various embodiments of the method illustrated in FIGS. 4a and 4b, whether or not explicitly recited in the description of these Figures.

On FIGS. 4a and 4b, a sequence 300 comprises a plurality of operations, some of which may be executed in variable order, some of the operations possibly being executed concurrently, some of the operations being optional. As shown on FIG. 4a, at operation 310, a symmetric key is applied to a key derivative function to generate first and second encryption keys. A nonce is generated at operation 320. The first encryption key is used to encode the nonce at operation 330. At operation 340, the message is split into a first part and a second part. Operation 340 may comprise sub-operation 345, in which one of the first and second message parts is padded so that the first and second message parts have equal sizes. The first encryption key and the encoded nonce are used at operation 350 to encrypt the first part of the message into a first ciphered part.

Continuing on FIG. 4b, the second encryption key, the encoded nonce and the first ciphered part are used at operation 360 to generate an initialization vector. Operation 360 may comprise sub-operation 365, in which an exclusive-OR function of the first ciphered part and of the second part of the message is computed. Then at operation 370, the first encryption key and the initialization vector are used to encrypt the second part of the message into a second ciphered part. A ciphertext comprising the first ciphered part, the second ciphered part, the initialization vector and the nonce is generated at operation 380. The ciphertext may be transmitted to, or otherwise provided to, a decoder having cognizance of the symmetric key of the generator or owner of the message.

Figure 5A:
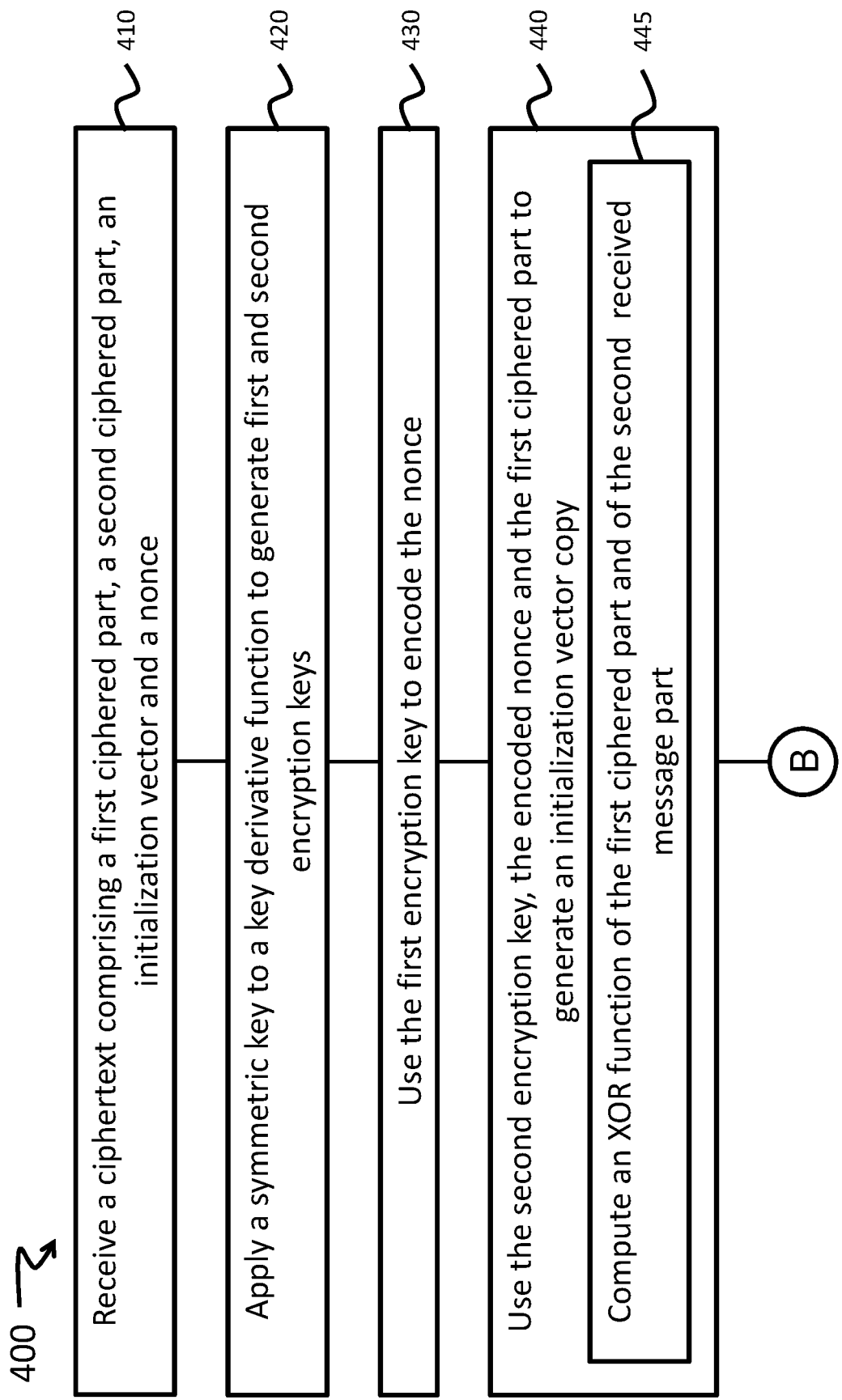
FIGS. 5a and 5b are a sequence diagram of a method for decrypting a message in accordance with non-limiting embodiments of the present disclosure.
Figure 5B:
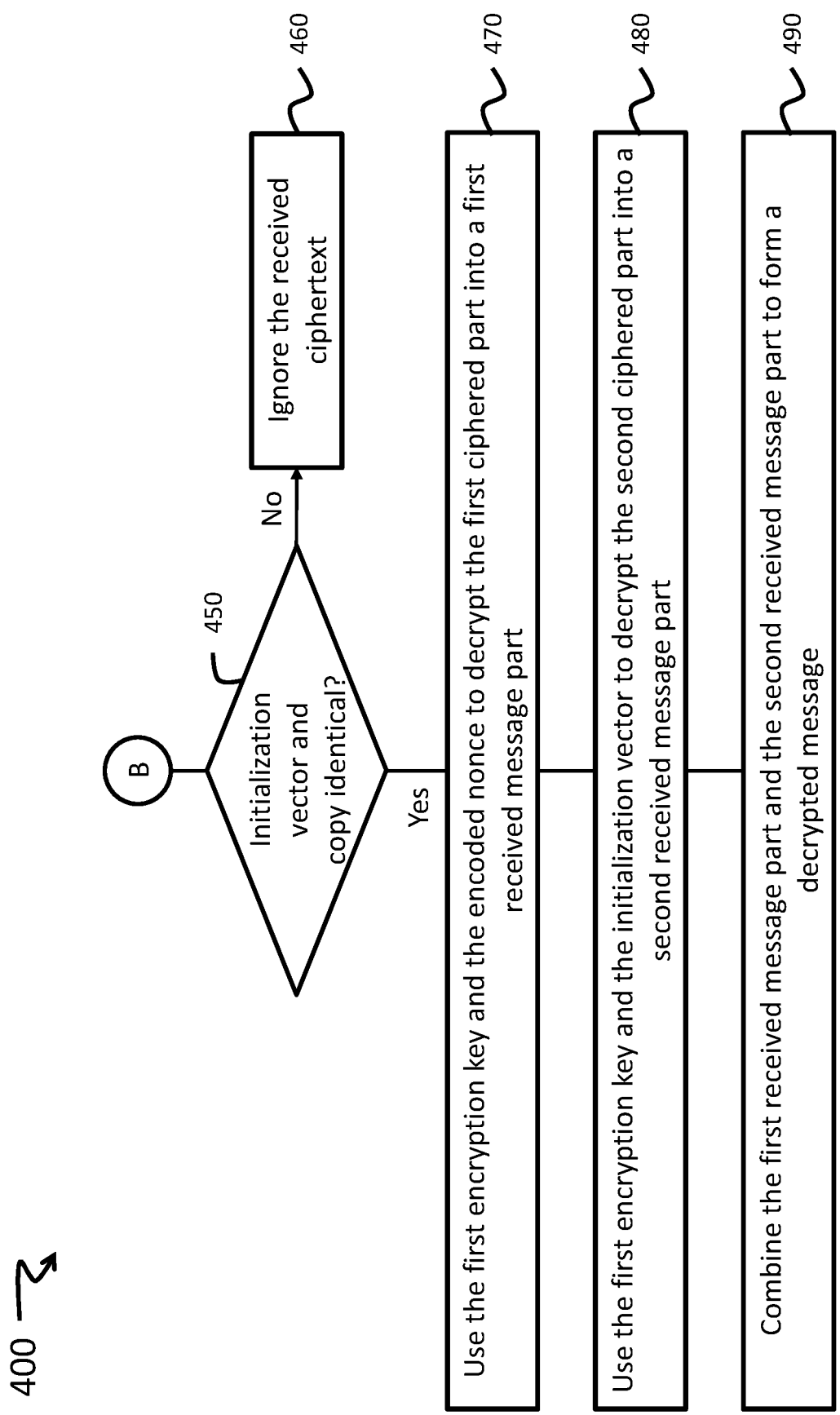

FIGS. 5a and 5b are a sequence diagram of a method for decrypting a message in accordance with non-limiting embodiments of the present disclosure. Some or all of the features of the decoder as expressed in the foregoing description of FIG. 3 may be present in various embodiments of the method illustrated in FIGS. 5a and 5b, whether or not explicitly recited in the description of these Figures.

On FIGS. 5a and 5b, a sequence 400 comprises a plurality of operations, some of which may be executed in variable order, some of the operations possibly being executed concurrently, some of the operations being optional. As shown on FIG. 5a, at operation 410, a ciphertext comprising a first ciphered part, a second ciphered part, an initialization vector and a nonce, is received from an encoder. A symmetric key of a generator or owner of the ciphertext may be applied to a key derivative function to generate first and second encryption keys at operation 420. The first encryption key is used at operation 430 to encode the nonce. At operation 440, the second encryption key, the encoded nonce and the first ciphered part are used to generate an initialization vector copy. Operation 440 may comprise sub-operation 445 in which an exclusive-OR function of the first ciphered part and of a second received message part is computed.

Continuing on FIG. 5b, an operation 450 determines whether the initialization vector copy is equal to the initialization vector received as part of the ciphertext. The received ciphertext may be ignored at operation 460 if there is a mismatch between the initialization vector and its copy. If there is a match between the initialization vector and its copy, the first encryption key and the encoded nonce may be used at operation 470 to decrypt the first ciphered part into a first received message part. The first encryption key and the initialization vector may be used at operation 480 to decrypt the second ciphered part into a second received message part. Then at operation 490, the first received message part and the second received message part may be combined to form a decrypted message. The decoder may forward the decrypted message to its intended receiver.

As expressed in the description of FIG. 3, some embodiments of the decoder may use the second part of the second received part, obtained at operation 480 by decrypting the second ciphertext, to generate the initialization vector copy. As such, operation 480 may precede operation 440 in these embodiments. In fact, when implementing the decoder, one may find easier to implement operations 410 to 440 and 470 to 490 before verification of the copy of the initialization vector at operation 450. Such various orderings of the operations of the sequence 400 will provide the same or equivalent results for the method illustrated in FIGS. 5a and 5b, and are all contemplated in the disclosure of the present technology.

Figure 6:
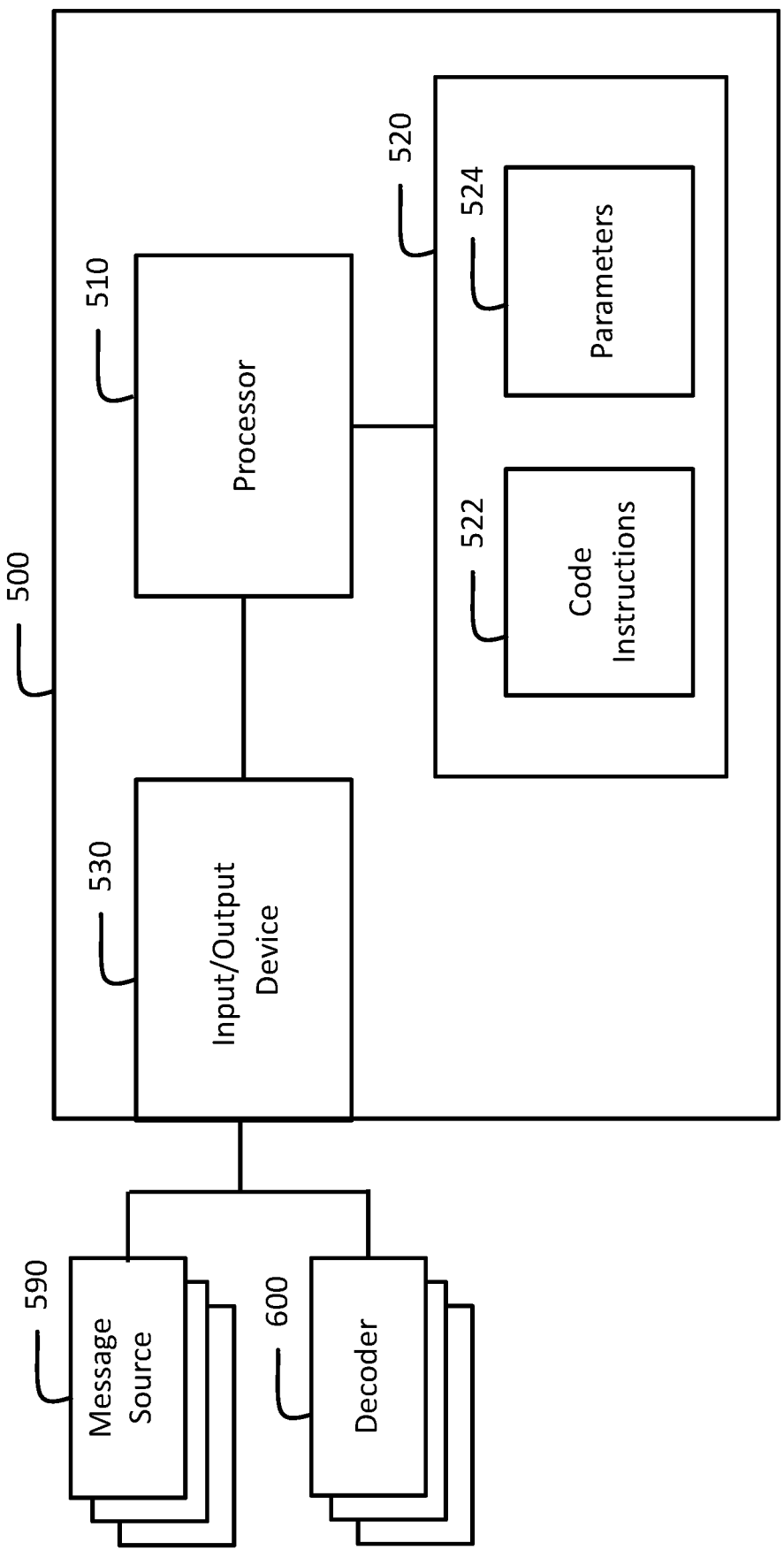
FIG. 6 is a block diagram of an encoder in accordance with non-limiting embodiments of the present disclosure.

The sequence 300 may be carried out by routines, subroutines, or engines of the software of the encoder. Coding of the software of the encoder for carrying out the sequence 300 is well within the scope of a person of ordinary skill in the art having regard to the present disclosure. For example, FIG. 6 is a block diagram of an encoder in accordance with non-limiting embodiments of the present disclosure. An encoder 500 comprises a processor or a plurality of cooperating processors (represented as a single processor 510 for simplicity), a memory device or a plurality of memory devices (represented as a single memory device 520 for simplicity), an input/output device or a plurality of input/output devices (represented as an input/output device 530 for simplicity). Separate input and output devices may be present instead of the input/output device 530. The processor 510 is operatively connected to the memory device 520 and to the input/output device 530. The memory device 520 may comprise a non-transitory computer-readable medium 522 for storing code instructions that are executable by the processor 500 to perform the operations of the sequence 300. The memory device 520 may also comprise a database 524 for storing data which may include, for example, the symmetric key of the generator or owner of a message. The input/output device 530 may be adapted to receive messages from one or more message sources 590 and to transmit ciphertexts to one or more decoders 600.

Figure 7:
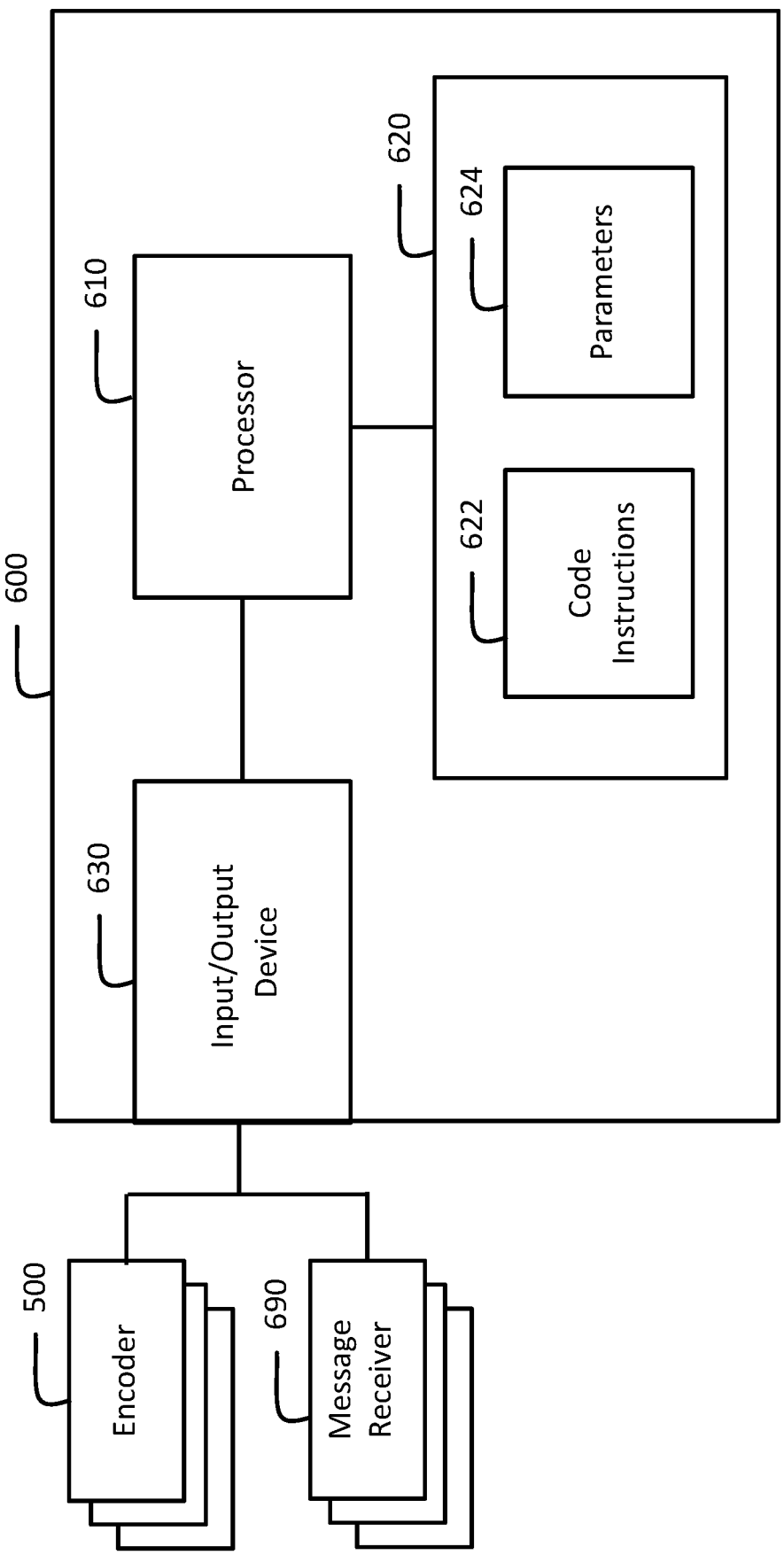
FIG. 7 is a block diagram of a decoder in accordance with non-limiting embodiments of the present disclosure.

The sequence 400 may be carried out by routines, subroutines, or engines of the software of the decoder. Coding of the software of the decoder for carrying out the sequence 400 is well within the scope of a person of ordinary skill in the art having regard to the present disclosure. For example, FIG. 7 is a block diagram of a decoder in accordance with non-limiting embodiments of the present disclosure. A decoder 600 comprises a processor or a plurality of cooperating processors (represented as a single processor 610 for simplicity), a memory device or a plurality of memory devices (represented as a single memory device 620 for simplicity), an input/output device or a plurality of input/output devices (represented as an input/output device 630 for simplicity). Separate input and output devices may be present instead of the input/output device 630. The processor 610 is operatively connected to the memory device 620 and to the input/output device 630. The memory device 620 may comprise a non-transitory computer-readable medium 622 for storing code instructions that are executable by the processor 600 to perform the operations of the sequence 400. The memory device 620 may also comprise a database 624 for storing data which may include, for example, the symmetric key of the generator or owner of a message. The input/output device 630 may be adapted to receive ciphertexts from one or more encoders 500 and to transmit decrypted messages to one or more message receivers 690.

It will be appreciated that the sequences 300 and 400 may also be performed by computer programs, which may exist in a variety of forms both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

It is to be understood that the operations and functionality of the described encoder and decoder, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for encrypting a message, comprising:
generating a nonce;
using a symmetric key to derive a first encryption key and a second encryption key;
using the first encryption key to encode the nonce;
splitting the message into a first part and a second part;
using the first encryption key, the encoded nonce, and applying a first cipher block encryption function to encrypt the first part of the message into a first ciphered part;
computing an exclusive-OR function of the first ciphered part and of the second part of the message;
using the second encryption key, the encoded nonce, a concatenation of a result of the exclusive-OR function with a first block and a last block of the first ciphered part, and applying a message authentication code function to generate an initialization vector;
using the first encryption key, the initialization vector, and applying a second cipher block encryption function to encrypt the second part of the message into a second ciphered part; and
generating a ciphertext comprising the first ciphered part, the second ciphered part, the initialization vector, and the nonce.

2. The method of claim 1, wherein:
the initialization vector is generated using the second encryption key, the encoded nonce, the first ciphered part and associated data related to the message; and
the generated ciphertext further comprises the associated data related to the message.

3. The method of claim 1, further comprising:
computing an exclusive-OR function of the first ciphered part and of the second part of the message;
wherein:
the initialization vector is generated using the second encryption key, the encoded nonce, a concatenation of a result of the exclusive-OR function with first and last blocks of the first ciphered part and associated data related to the message, and
the generated ciphertext further comprises the associated data related to the message.

4. The method of claim 1, wherein generating the nonce comprises generating a unique nonce.

5. The method of claim 1, further comprising applying a symmetric key to a key derivative function to generate the first and second encryption keys.

6. The method of claim 1, wherein the nonce is encrypted using an advanced encryption standard (AES) function.

7. The method claim 1, further comprising padding one of the first and second message parts so that the first and second message parts have equal sizes.

8. The method of claim 1, wherein the first and second parts of the message are encrypted using advanced encryption standard block cipher mode (AES-CBC) functions.

9. The method of claim 1, wherein the initialization vector is generated using a Galois message authentication code (GMAC) function.

10. An encoder, comprising:
an input/output device that receives a message and transmits a ciphertext; and
a processor operatively connected to the input/output device and to a memory device comprising a non-transitory computer-readable medium having stored thereon machine executable instructions for performing, when executed by the processor, the following processing tasks:

generating a nonce;
using a symmetric key to derive a first encryption key and a second encryption key;
using the first encryption key to encode the nonce;
splitting the message into a first part and a second part;
using the first encryption key, the encoded nonce, and applying a first cipher block encryption function to encrypt the first part of the message into a first ciphered part;
computing an exclusive-OR function of the first ciphered part and of the second part of the message;
using the second encryption key, the encoded nonce, a concatenation of a result of the exclusive-OR function with a first block and a last block of the first ciphered part, and applying a message authentication code function to generate an initialization vector;
using the first encryption key, the initialization vector, and applying a second cipher block encryption function to encrypt the second part of the message into a second ciphered part; and
generating a ciphertext comprising the first ciphered part, the second ciphered part, the initialization vector, and the nonce.

11. A method for decrypting a message, comprising:
receiving a ciphertext comprising a first ciphered part, a second ciphered part, an initialization vector, and a nonce;
using a symmetric key to derive a first encryption key and a second encryption key;
using the first encryption key to encode the nonce;
using the first encryption key, the encoded nonce, and applying a first cipher block encryption function to decrypt the first ciphered part into a first received message part;
using the first encryption key, the initialization vector, and applying a second cipher block encryption function to decrypt the second ciphered part into a second received message part;
computing an exclusive-OR function of the first ciphered part and of the second part of the message;
combining the first received message part and the second received message part to form a decrypted message;
using the second encryption key, the encoded nonce, and a concatenation of a result of the exclusive-OR function with a first block and a last block of the first ciphered part to generate an initialization vector copy; and
ignoring the received ciphertext when the initialization vector copy is not equal to the initialization vector.

12. The method of claim 11, wherein:
the received ciphertext further comprises associated data related to the message; and
the initialization vector copy is generated using the second encryption key, the encoded nonce, the first ciphered part and the associated data related to the message.

13. The method of claim 11, further comprising:
computing an exclusive-OR function of the first ciphered part and of the second received message part;
wherein:
the received ciphertext further comprises associated data related to the message,
the initialization vector copy is generated using the second encryption key, the encoded nonce, a concatenation of a result of the exclusive-OR function with first and last blocks of the first ciphered part and the associated data related to the message.

14. The method of claim 11, further comprising applying a symmetric key to a key derivative function to generate the first and second encryption keys.

15. The method of claim 11, wherein the nonce is encrypted using an advanced encryption standard (AES) function.

16. The method of claim 11, wherein the first and second ciphered parts are decrypted using advanced encryption standard block cipher mode (AES-CBC) functions.

17. The method of claim 11, wherein the initialization vector copy is generated using a Galois message authentication code (GMAC) function.

18. A decoder, comprising: an input/output device that receives a ciphertext and transmits a decrypted message; and a processor operatively connected to the input/output device and to a memory device comprising a non-transitory computer-readable medium having stored thereon machine executable instructions for performing, when executed by the processor, the following processing tasks:
receiving a ciphertext comprising a first ciphered part, a second ciphered part, an initialization vector and a nonce,
using a symmetric key to derive a first encryption key and a second encryption key;
using the first encryption key to encode the nonce,
using the first encryption key, the encoded nonce, and applying a first cipher block encryption function to decrypt the first ciphered part into a first received message part;
using the first encryption key, the initialization vector, and applying a second cipher block encryption function to decrypt the second ciphered part into a second received message part;
computing an exclusive-OR function of the first ciphered part and of the second part of the message;
combining the first received message part and the second received message part to form a decrypted message,
using the second encryption key, the encoded nonce and a concatenation of a result of the exclusive-OR function with a first block and a last block of the first ciphered part to generate an initialization vector copy; and
ignoring the received ciphertext when the initialization vector copy is not equal to the initialization vector.

* * * * *